No. 12,802.
REISSUED JUNE 2, 1908.
M. A. FESLER.
OIL BURNER.
APPLICATION FILED JAN. 21, 1907.
2 SHEETS—SHEET 1.
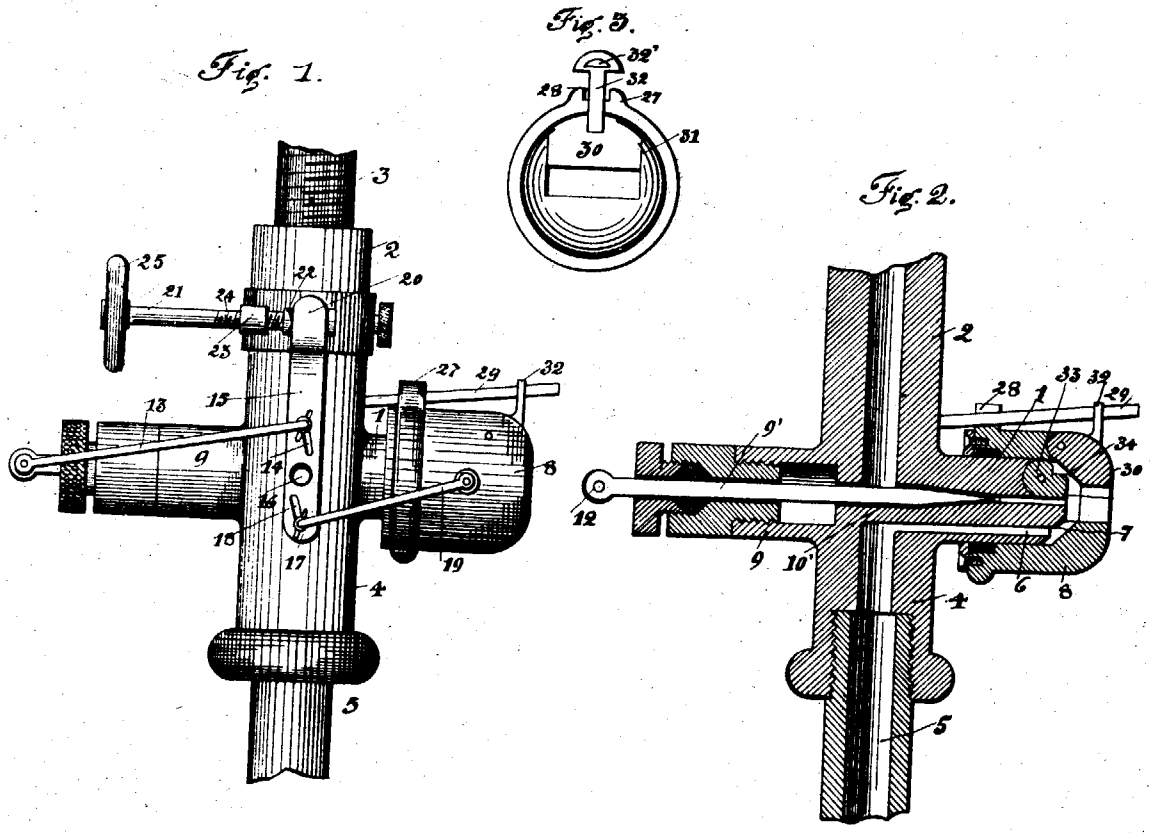
Witnesses
Inventor,
Milton A. Fesler
By F. M. Wright,
Attorney.

No. 12,802.

REISSUED JUNE 2, 1908.

M. A. FESLER.

OIL BURNER.

APPLICATION FILED JAN. 21, 1907.

2 SHEETS—SHEET 2.

Witnesses:

O. Neil

E. Cohn

Inventor,

Milton A. Fesler by F. M. Wright,

Attorney

UNITED STATES PATENT OFFICE.

MILTON A. FESLER, OF BERKELEY, CALIFORNIA, ASSIGNOR OF FORTY-FIVE ONE-HUNDREDTHS TO DONLEY C. GRAY, OF TULARE COUNTY, CALIFORNIA.

OIL-BURNER.

No. 12,302. Specification of Reissued Letters Patent. Reissued June 2, 1908.

Original No. 791,617, dated June 6, 1905, Serial No. 210,999. Application for reissue filed January 21, 1907. Serial No. 353,406.

*To all whom it may concern:*

Be it known that I, MILTON A. FESLER, a citizen of the United States, residing at Berkeley, in the county of Alameda and State of California, have invented certain new and useful Improvements in Oil-Burners, of which the following is a specification.

My invention relates to improvements in oil-burners especially adapted for burning crude oil.

The primary object of the invention is to provide a simple and reliable means for regulating the supply of oil and steam passing through the nozzle and for varying the size of the opening in the nozzle, so as to effectually atomize the oil under varying steam-pressures.

A further object is to so construct the nozzle and nozzle cap valve that oil and steam may be mixed in proper proportions before being ejected from the nozzle and to accomplish this object with a ready and convenient movement of the regulating device.

A still further object is to improve upon the jet shown and described in Letters Patent No. 714,467, granted to me November 25, 1902.

Other objects and advantages resulting from this construction will become apparent in the course of the following description, and the points of novelty will be set forth in the claims.

Figure 4:
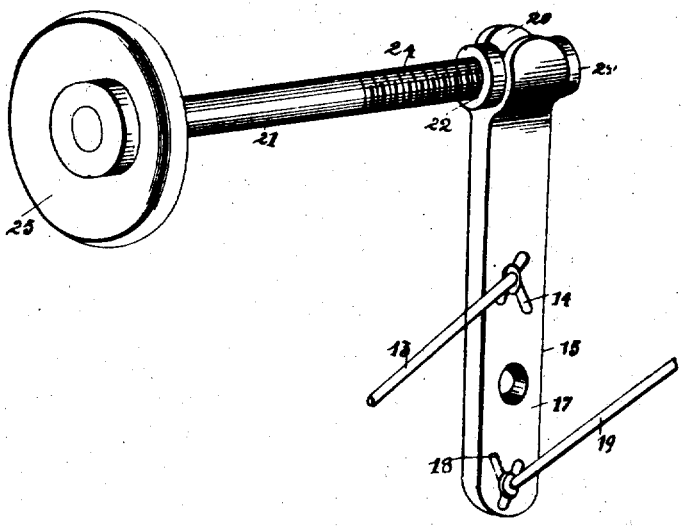
Figure 6:
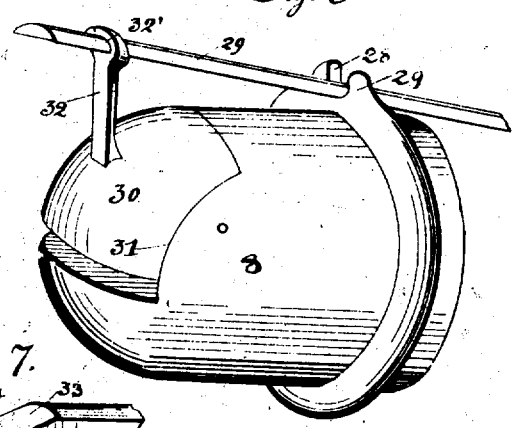
Figure 5:
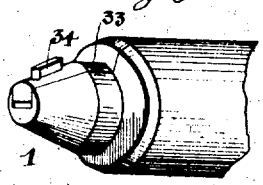
Figure 7:
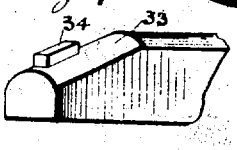

In the drawings illustrating the invention, Figure 1 is a side elevation of the vaporizing-jet, showing a portion of the steam and oil connections, which may be the same as those shown in my patent above referred to. Fig. 2 is a central vertical section of the jet and a slidable cap for controlling the passage of the oil from the jet and regulating the same. Fig. 3 is an end view of this cap, showing more clearly the form of opening therein. Fig. 4 is a detail perspective view of the device for accomplishing the regulating movements of the movable jet parts. Fig. 5 is an enlarged perspective view of the end of the nozzle. Fig. 6 is a detail perspective view of the cap valve, showing its relation to the device for increasing or diminishing the opening in the cap; and Fig. 7 is a perspective view of a detached portion of the nozzle end.

Referring to the drawings, the numeral 1 indicates the nozzle, preferably formed with a tapered end, as shown, as is usual in devices of this character, but which, as will appear later on, is made to perform a function in connection with the cap-valve that will be described. This jet is formed with an upwardly-projecting branch 2, externally threaded, as indicated by the numeral 3, for a portion of its length for the reception of a suitable union or joint, with which the jet is connected, with the steam-generator. (Not shown herein, but clearly shown in the patent referred to.) The numeral 4 designates the second branch, internally threaded for the reception of the oil-supply pipe 5, leading from any suitable source, the oil in which pipe is maintained below the nozzle by gravity or other force at the proper point. The nozzle is provided with a narrow oil passage or duct 6, communicating with the central bore of the branch 4 and opening at the end of the nozzle, at the under side thereof, into the space 7, between the end of said nozzle and the cap-valve 8, all of which will be presently more fully described in connection with the mechanism for operating the regulating device.

The numeral 9 designates the branch through which works a needle 9′, which is the same as that ordinarily employed in devices of this character, but which in the present instance is arranged to work a little farther back into the nozzle than is usual for a purpose that will presently become apparent. This needle is suitably packed and occupies the steam passage or duct 10′ in the nozzle and whereby the steam-passage is controlled. This needle is provided at its rear end with an eye 12 for pivotal connection with the connecting rod or link 13, which has its forward end pivotally and adjustably secured in oblique slot 14 in the rocker arm or lever 15, pivoted to the jet-casting at 16 and extending a short distance below the pivot, as indicated by 17. The lower end of this arm is provided with a slot 18, in which is also pivotally and adjustably secured the rear end of the rod 19, which rod has its forward end pivoted to the side of the cap-valve 8, as shown in Fig. 1. The upper end of the arm 15 is bifurcated or forked, as indicated at 20, the tines of the fork straddling the forward end of a shaft or stem 21. The end of the shaft is provided with two collars 22 to form abutments for the upper end of the arm 15, so as to rock said arm on its pivot when the shaft or stem is moved for the purpose of adjusting the parts. This stem or shaft passes through an internally-screw-threaded boss 23, rigidly secured to the jet-casting, and is itself threaded for a portion of its length, as indicated by the numeral 24, and is provided at its rear end with a hand-wheel 25.

To prevent the cap-valve 8 from turning, and thereby changing the position of the elongated opening or slit therein, I provide it with a lug or projection 27, through which is cut a recess 28, which is occupied by a rod 29, rigidly secured to the jet-casting at a point where it will ride through said recess. This rod 29 is inclined upwardly from the casting, as shown in Figs. 1 and 2, and serves a further function than to merely guide the cap valve and prevent it from turning, as will now be described.

The numeral 30 indicates a hinged lip which operates in a recess 31 in the slidable cap-valve 8 and is provided on its upper side with a standard 32, having an eye 32′, through which works the rod 29, which rod being stationary and inclined will cause the lip 30 to move vertically up or down to enlarge or diminish the size of the opening in the cap, which is advantageous to more effectually atomize the oil under varying steam-pressures or varying quantities and consistencies of oil. To coöperate with this feature of the device, I provide the end of the nozzle with a movable end section 33, provided along its top edge with a spline 34, adapted to be engaged by the under side of the movable lip 30 when the cap is moved rearwardly. This movement of the nozzle end will diminish the size of the opening in the nozzle, and consequently control the steam-pressure, making the same greater or less at the nozzle, as the needs of the case may require. Thus with a low steam-pressure, with the cap moved rearwardly to the desired point, the nozzle end would be contracted, increasing the pressure at this point. While accomplishing this result by moving or sliding the cap rearwardly, the oil-supply is reduced to a certain extent by reason of the closer proximity of the cap to the nozzle end, and at the same time the movable lip will descend and provide an opening wherewith the oil is caused to be more thoroughly vaporized. Of course it will be understood that the reverse movement of the cap, which results in disengaging the lip 30 from the spline 34, will permit the nozzled end to open wider and cause the lip to be lifted, thus increasing the outlet from the nozzle, as well as from the cap-valve.

Although the operation of the device has been fairly suggested in the foregoing description, I will nevertheless for the purpose of more clearly understanding the same now describe it. Assuming the desired relation between the nozzle and the cap valve has been determined and the rods 13 and 19 correspondingly adjusted in the slots in the arms 15 and the burner working well under prevailing conditions and it is desired to regulate the openings in the steam and oil passage to accommodate the jet to other conditions, the hand wheel is rotated or, rather, partially turned in one direction or the other, depending upon the oil and steam supplies desired or required, and by reason of the thread on said stem engaging with those in the lug 23 the stem will be moved backward or forward, as the case may be, and will by reason of its connection with the upper end of the arm 15 rock said arm, which in turn and through the medium of rods 13 and 19 move the cap and needle to or from each other, thus increasing or diminishing the volume of mixed steam and oil that is ejected from the jet into the fire-box or combustion-chamber. A rearward movement of the cap will cause the lip 30 to move down to diminish the size of the opening in the cap-valve and cause the needle to diminish the steam-supply, thus increasing the steam-pressure at the end of the nozzle to a degree where it will be in proper proportion to the amount of oil to be atomized. The reverse movement of these parts will be desirable with an increase steam-pressure, which movement will cause the lip 30 to be lifted and increase the size of the opening in the cap-valve, the steam-pressure with this movement being free to lift the movable end of the nozzle, this movable portion of the nozzle being now free to move upward by reason of the disengagement of the under side of the lip 30 from the spline 34.

While I have shown and described a construction wherein the movements of the needle and the cap by reason of the connections between them are somewhat dependent upon each other, I do not desire to be understood as limiting myself in this particular for it is obvious that the needle adjustment may be accomplished independent of the cap valve, as is usual in devices of this character, or may be dispensed with, in which event the escapement of steam from the nozzle would be controlled or regulated by reason of the engagement or disengagement of the cap with or from the movable nozzle end. The degree of movement of the needle and cap valve is governed or regulated by the position the rod ends occupy in the slots 14 and 17, which is determined by the character or consistency of the oil used and the steam-supply desired or required to most effectually atomize the oil and as a result obtain perfect combustion. The position of the rods shown in Fig. 1 is such that the movement of the cap valve and needle would be about the same; but, as before stated, a different adjustment of one or both rods would result in different movements of the needle and cap.

It will be understood that the movable end of the nozzle is operated upon by the cap when it is desired to contract the opening in the nozzle to increase the steam-pressure; but when a full volume of steam is desired the cap will be in the position shown in Fig. 2, leaving the steam free to lift the nozzle end, increasing the opening therein to its fullest capacity.

It is advantageous to have the opening in the nozzle end oblong in shape, so as to produce a wide fan-like jet, so as to span or cover a considerable surface that is desired to be heated.

While I prefer that the oil should be supplied through the oil duct or passage 6 and the steam through the central passage in the nozzle, it is obvious that this order may be reversed and the oil fed through the passage 10′ and controlled by the needle and the steam supplied through the passage or duct 6 and controlled by the cap-valve 8.

I claim:—

1. In a jet for oil-burners, the combination with a nozzle, of a longitudinally-movable cap-valve fitting over said nozzle, a needle movable in said nozzle, for the purpose set forth, a rockable arm pivotally secured to said jet and having connections with the valve or cap and needle, whereby the cap and needle are moved together when the arm is rocked, and a regulating device so connected with said arm as to move the same upon the manipulation of said device, substantially as described.

2. In a jet for oil-burners, the combination with a nozzle, having a movable end portion, a slidable cap-valve fitting over said nozzle, a needle movable in said nozzle, connections between the needle and cap valve whereby they are moved together and means carried by the cap for engaging the movable end portion of the nozzle to diminish the opening therein when desired, substantially as described.

3. In a jet for oil-burners, the combination with a nozzle, having a movable end portion, a needle working in said nozzle for the purpose described, a slidable cap-valve fitting over said nozzle, and having an opening therein registering with the opening in the nozzle, a movable lip working in said cap-valve and adapted to increase or diminish the size of the opening therein, means for operating said lip by movement of the cap, means carried by the cap-valve adapted to engage the movable portion of the nozzle for the purpose described, and connections between said needle and cap-valve whereby they are moved together, substantially as and for the purpose set forth.

4. In a jet for oil-burners, the combination with suitable oil and steam supplies, of a nozzle having steam and oil passages, means for controlling the admission of steam to the nozzle, a slidable cap-valve fitting over said nozzle and operating to control the passage of oil through the nozzle and having an opening therein, a movable lip working in said cap-valve and adapted to increase or diminish the size of the opening in said cap-valve, and means for automatically operating said cap, substantially as described.

5. In a jet for oil-burners, the combination with suitable steam and oil supplies, of a nozzle having steam and oil passages therethrough, means for controlling the admission of steam to said nozzle, a cap-valve fitting over said nozzle and operating to control the passage of oil through the nozzle, and having an opening therein, a movable lip working in said cap-valve and adapted to increase or diminish the size of said opening, and means for operating said lip by the movement of the cap-valve, substantially as described.

6. In a jet for oil-burners, the combination with a nozzle, having a movable end portion, means for controlling the admission of steam to said nozzle, a movable cap valve fitting over said nozzle and having an opening therein, a movable lip working in said cap-valve and adapted to increase or diminish the size of the opening therein, means for operating said lip by the movement of the cap-valve, means carried by said cap-valve adapted to engage the movable portion of the nozzle for the purpose described.

7. In a jet for oil-burners the combination with a nozzle of a movable cap-valve fitting over said nozzle and having an opening therein for the passage of oil and steam, said cap-valve operating to control the passage of oil through the nozzle and means for automatically increasing or diminishing the size of the opening in the cap-valve, substantially as described.

8. In a jet for oil-burners, the combination with a nozzle having a movable end portion adapted to operate as described of a cap-valve fitting over said nozzle and adapted to slide thereon and having an opening, means for increasing or diminishing the opening in the cap-valve, and means carried by the cap adapted to operate upon the movable portion of the nozzle and to contract the opening therein, substantially as described.

9. In a jet for oil-burners, the combination with a nozzle, having steam and oil passages therethrough, of a movable cap-valve fitting over said nozzle and having an opening therein for the passage of oil and steam, said cap-valve operating primarily to control the passage of oil through the nozzle, means carried by the nozzle and adapted to be engaged by the cap valve to diminish the size of the opening in said nozzle, and means for increasing or diminishing the size of the opening in the cap-valve, substantially as described.

10. In a jet for oil-burners, the combination with a nozzle, having steam and oil passages therethrough, of suitable oil and steam supplies, an adjustable cap-valve fitting over said nozzle, a needle movable in said nozzle for the purpose set forth, connections between said cap-valve and needle whereby they are moved together to regulate the oil and steam supply, and means for adjusting both of said connections to determine the relative movement of the cap-valve and needle, substantially as described.

11. In a jet for oil burners, the combination with a nozzle having steam and oil passages therethrough, and a suitable oil and steam supply, a longitudinally slidable cap valve over said nozzle, means extending to the rear of the burner for sliding said cap valve longitudinally relatively to said nozzle, and means operated by said longitudinal movement of the cap valve for controlling the passage of the steam to said nozzle, substantially as described.

In witness whereof I have hereunto set my hand in the presence of the two subscribing witnesses.

MILTON A. FESLER.

Witnesses:

FRANCIS M. WRIGHT,

E. COHN.